(12) United States Patent
Govari et al.

(10) Patent No.: US 12,544,128 B2
(45) Date of Patent: Feb. 10, 2026

(54) BALLOON CATHETER WITH SPLIT ELECTRODES

(71) Applicant: Biosense Webster (Israel) Ltd., Yokneam (IL)

(72) Inventors: Assaf Govari, Haifa (IL); Christopher Thomas Beeckler, Brea, CA (US); Joseph Thomas Keyes, Sierra Madre, CA (US); Kevin Justin Herrera, West Covina, CA (US)

(73) Assignee: Biosense Webster (Israel) Ltd., Yokneam (IL)

( * ) Notice: Subject to any disclaimer, the term of this patent is extended or adjusted under 35 U.S.C. 154(b) by 326 days.

(21) Appl. No.: 17/086,164

(22) Filed: Oct. 30, 2020

(65) Prior Publication Data
US 2022/0133402 A1 May 5, 2022

(51) Int. Cl.
*A61B 18/14* (2006.01)
*A61B 18/00* (2006.01)
*A61B 18/12* (2006.01)

(52) U.S. Cl.
CPC ...... *A61B 18/1492* (2013.01); *A61B 18/1206* (2013.01); *A61B 2018/0022* (2013.01);
(Continued)

(58) Field of Classification Search
None
See application file for complete search history.

(56) References Cited

U.S. PATENT DOCUMENTS

| D123,782 S | 12/1940 | Paul |
| 3,316,896 A | 5/1967 | Louis |

(Continued)

FOREIGN PATENT DOCUMENTS

| CN | 101422637 A | 5/2009 |
| CN | 102271607 A | 12/2011 |

(Continued)

OTHER PUBLICATIONS

Extended European Search Report dated Apr. 7, 2022, from corresponding Eurpean Appl. No. 21205637.8.
(Continued)

*Primary Examiner* — Sean W Collins
*Assistant Examiner* — Nora W Rhodes

(57) ABSTRACT

A medical apparatus includes a probe, which includes an insertion tube configured for insertion into a body cavity. A balloon is connected distally to the insertion tube and is inflated within the body with a fluid that flows into the balloon through the insertion tube. Electrodes are disposed at different respective locations on a surface of the balloon and configured to contact tissue within the body cavity, each electrode being divided into multiple segments, including at least two segments having different respective areas. An electrical signal generator applies radio-frequency (RF) signals simultaneously in parallel to the multiple segments of each electrode with an amplitude sufficient to ablate the tissue contacted by the electrode. Sensing circuitry acquires electrophysiological signals from at least one of the multiple segments of each electrode separately and independently of the other segments of the electrode.

17 Claims, 2 Drawing Sheets

(52) U.S. Cl.
CPC .......... *A61B 2018/00577* (2013.01); *A61B 2018/00839* (2013.01); *A61B 2018/1467* (2013.01); *A61B 2218/002* (2013.01)

(56) References Cited

U.S. PATENT DOCUMENTS

| | | | |
|---|---|---|---|
| 4,276,874 A | 7/1981 | Wolvek et al. | |
| 4,587,975 A | 5/1986 | Salo et al. | |
| 4,709,698 A | 12/1987 | Johnston et al. | |
| 4,805,621 A | 2/1989 | Heinze et al. | |
| 5,178,957 A | 1/1993 | Kolpe et al. | |
| 5,429,617 A | 7/1995 | Hammersmark et al. | |
| 5,582,609 A | 12/1996 | Swanson et al. | |
| 5,584,830 A | 12/1996 | Ladd et al. | |
| 5,702,386 A | 12/1997 | Stern et al. | |
| 5,718,241 A | 2/1998 | Ben-Haim et al. | |
| 5,797,903 A | 8/1998 | Swanson et al. | |
| 5,860,974 A | 1/1999 | Abele | |
| 5,971,983 A | 10/1999 | Lesh | |
| 6,012,457 A | 1/2000 | Lesh | |
| 6,024,740 A | 2/2000 | Lesh et al. | |
| 6,042,580 A | 3/2000 | Simpson | |
| 6,123,718 A | 9/2000 | Tu et al. | |
| 6,164,283 A | 12/2000 | Lesh | |
| 6,171,275 B1 | 1/2001 | Webster, Jr. | |
| 6,176,832 B1 | 1/2001 | Habu et al. | |
| 6,198,974 B1 | 3/2001 | Webster, Jr. | |
| 6,226,542 B1 | 5/2001 | Reisfeld | |
| 6,301,496 B1 | 10/2001 | Reisfeld | |
| 6,322,558 B1 | 11/2001 | Taylor et al. | |
| 6,380,957 B1 | 4/2002 | Banning | |
| 6,402,740 B1 | 6/2002 | Ellis et al. | |
| D462,389 S | 9/2002 | Provence et al. | |
| 6,471,693 B1 | 10/2002 | Carroll et al. | |
| 6,522,930 B1 | 2/2003 | Schaer et al. | |
| 6,656,174 B1 | 12/2003 | Hegde et al. | |
| 6,814,733 B2 | 11/2004 | Schwartz et al. | |
| 6,893,433 B2 | 5/2005 | Lentz | |
| 6,986,744 B1 | 1/2006 | Krivitski | |
| 6,987,995 B2 | 1/2006 | Drysen | |
| 6,997,924 B2 | 2/2006 | Schwartz et al. | |
| 7,142,903 B2 | 11/2006 | Rodriguez et al. | |
| 7,156,816 B2 | 1/2007 | Schwartz et al. | |
| 7,274,957 B2 | 9/2007 | Drysen | |
| 7,340,307 B2 | 3/2008 | Maguire et al. | |
| 7,377,906 B2 | 5/2008 | Selkee | |
| 7,442,190 B2 | 10/2008 | Abbound et al. | |
| 7,536,218 B2 | 5/2009 | Govari et al. | |
| 7,591,799 B2 | 9/2009 | Selkee | |
| 7,593,760 B2 | 9/2009 | Rodriguez et al. | |
| 7,720,517 B2 | 5/2010 | Drysen | |
| 7,756,576 B2 | 7/2010 | Levin | |
| 7,842,031 B2 | 11/2010 | Abboud et al. | |
| 7,853,302 B2 | 12/2010 | Rodriguez et al. | |
| 8,000,765 B2 | 8/2011 | Rodriguez et al. | |
| 8,021,327 B2 | 9/2011 | Selkee | |
| 8,048,032 B2 | 11/2011 | Root et al. | |
| 8,231,617 B2 | 7/2012 | Satake | |
| 8,267,932 B2 | 9/2012 | Baxter et al. | |
| 8,275,440 B2 | 9/2012 | Rodriguez et al. | |
| 8,348,888 B2 | 1/2013 | Selkee | |
| 8,357,152 B2 | 1/2013 | Govari et al. | |
| D682,289 S | 5/2013 | DiJulio et al. | |
| D682,291 S | 5/2013 | Baek et al. | |
| 8,456,182 B2 | 6/2013 | Bar-Tal et al. | |
| D690,318 S | 9/2013 | Kluttz et al. | |
| D694,652 S | 12/2013 | Tompkin | |
| 8,641,709 B2 | 2/2014 | Sauvageau et al. | |
| 8,721,590 B2 | 5/2014 | Seward et al. | |
| 8,777,161 B2 | 7/2014 | Pollock et al. | |
| D716,340 S | 10/2014 | Bresin et al. | |
| 8,852,181 B2 | 10/2014 | Malecki et al. | |
| D720,766 S | 1/2015 | Mandal et al. | |
| D721,379 S | 1/2015 | Moon et al. | |
| D724,618 S | 3/2015 | Shin | |
| 8,998,893 B2 | 4/2015 | Avitall | |
| D729,263 S | 5/2015 | Ahn et al. | |
| 9,089,350 B2 | 7/2015 | Willard | |
| D736,780 S | 8/2015 | Wang | |
| 9,126,023 B1 | 9/2015 | Sahatjian et al. | |
| D740,308 S | 10/2015 | Kim et al. | |
| D743,424 S | 11/2015 | Danielyan et al. | |
| D744,000 S | 11/2015 | Villamor et al. | |
| 9,173,758 B2 | 11/2015 | Brister et al. | |
| D747,742 S | 1/2016 | Fan et al. | |
| D750,644 S | 3/2016 | Bhutani et al. | |
| 9,283,034 B2 | 3/2016 | Katoh et al. | |
| 9,289,141 B2 | 3/2016 | Lowery et al. | |
| D753,690 S | 4/2016 | Vazquez et al. | |
| 9,320,631 B2 | 4/2016 | Moore et al. | |
| 9,345,540 B2 | 5/2016 | Mallin et al. | |
| D759,673 S | 6/2016 | Looney et al. | |
| D759,675 S | 6/2016 | Looney et al. | |
| D764,500 S | 8/2016 | Wang | |
| D765,709 S | 9/2016 | Gagnier | |
| D767,616 S | 9/2016 | Jones et al. | |
| D768,696 S | 10/2016 | Gagnier | |
| D783,037 S | 4/2017 | Hariharan et al. | |
| 9,655,677 B2 | 5/2017 | Salahieh et al. | |
| D791,805 S | 7/2017 | Segars | |
| 9,795,442 B2 | 10/2017 | Salahieh et al. | |
| 9,907,610 B2 | 3/2018 | Beeckler et al. | |
| 9,943,365 B2 | 4/2018 | Haverkost et al. | |
| 9,956,035 B2 | 5/2018 | Govari et al. | |
| D861,717 S | 10/2019 | Brekke et al. | |
| 10,653,480 B2 | 5/2020 | Beeckler et al. | |
| 10,688,278 B2 | 6/2020 | Beeckler et al. | |
| 10,786,305 B2 | 9/2020 | Mahvi et al. | |
| 2001/0031961 A1 | 10/2001 | Hooven | |
| 2002/0002369 A1 | 1/2002 | Hood | |
| 2002/0065455 A1 | 5/2002 | Ben-Haim et al. | |
| 2002/0068931 A1 | 6/2002 | Wong et al. | |
| 2002/0077627 A1 | 6/2002 | Johnson et al. | |
| 2002/0160134 A1 | 10/2002 | Ogushi et al. | |
| 2003/0018327 A1 | 1/2003 | Truckai et al. | |
| 2003/0028183 A1 | 2/2003 | Sanchez et al. | |
| 2003/0050637 A1 | 3/2003 | Maguire et al. | |
| 2003/0060820 A1 | 3/2003 | Maguire et al. | |
| 2003/0144658 A1 | 7/2003 | Schwartz et al. | |
| 2004/0122445 A1 | 6/2004 | Butler et al. | |
| 2004/0147920 A1 | 7/2004 | Keidar | |
| 2004/0225285 A1 | 11/2004 | Gibson | |
| 2005/0070887 A1 | 3/2005 | Taimisto et al. | |
| 2005/0119686 A1 | 6/2005 | Clubb | |
| 2006/0013595 A1 | 1/2006 | Trezza et al. | |
| 2006/0106375 A1 | 5/2006 | Werneth et al. | |
| 2006/0135953 A1 | 6/2006 | Kania et al. | |
| 2007/0071792 A1 | 3/2007 | Varner et al. | |
| 2007/0080322 A1 | 4/2007 | Walba | |
| 2007/0083194 A1 | 4/2007 | Kunis et al. | |
| 2007/0287994 A1 | 12/2007 | Patel | |
| 2008/0018891 A1 | 1/2008 | Hell et al. | |
| 2008/0021313 A1 | 1/2008 | Eidenschink et al. | |
| 2008/0051707 A1 | 2/2008 | Phan et al. | |
| 2008/0140072 A1 | 6/2008 | Stangenes et al. | |
| 2008/0183132 A1 | 7/2008 | Davies et al. | |
| 2008/0188912 A1 | 8/2008 | Stone et al. | |
| 2008/0202637 A1 | 8/2008 | Hector et al. | |
| 2008/0208186 A1 | 8/2008 | Slater | |
| 2008/0249463 A1 | 10/2008 | Pappone et al. | |
| 2008/0262489 A1 | 10/2008 | Steinke | |
| 2008/0281312 A1 | 11/2008 | Werneth et al. | |
| 2009/0163890 A1 | 6/2009 | Clifford et al. | |
| 2009/0182318 A1 | 7/2009 | Abboud et al. | |
| 2009/0248012 A1* | 10/2009 | Maor .............. A61N 1/327 606/41 |
| 2009/0270850 A1 | 10/2009 | Zhou et al. | |
| 2010/0069836 A1 | 3/2010 | Satake | |
| 2010/0114269 A1 | 5/2010 | Wittenberger et al. | |
| 2010/0204560 A1 | 8/2010 | Salahieh et al. | |
| 2010/0256629 A1 | 10/2010 | Wylie et al. | |
| 2010/0324552 A1 | 12/2010 | Kauphusman et al. | |
| 2011/0118632 A1 | 5/2011 | Sinelnikov et al. | |
| 2011/0130648 A1 | 6/2011 | Beeckler et al. | |

(56) References Cited

U.S. PATENT DOCUMENTS

| | | |
|---|---|---|
| 2011/0282338 A1 | 11/2011 | Fojtik |
| 2011/0295248 A1 | 12/2011 | Wallace et al. |
| 2011/0301587 A1 | 12/2011 | Deem et al. |
| 2011/0313286 A1 | 12/2011 | Whayne et al. |
| 2012/0019107 A1 | 1/2012 | Gabl et al. |
| 2012/0029500 A1 | 2/2012 | Jensen et al. |
| 2012/0029511 A1 | 2/2012 | Smith et al. |
| 2012/0065503 A1 | 3/2012 | Rogers et al. |
| 2012/0071870 A1 | 3/2012 | Salahieh et al. |
| 2012/0079427 A1 | 3/2012 | Carmichael et al. |
| 2012/0101413 A1 | 4/2012 | Beetel et al. |
| 2012/0101538 A1 | 4/2012 | Ballakur et al. |
| 2012/0143177 A1 | 6/2012 | Avitall |
| 2012/0143293 A1 | 6/2012 | Mauch et al. |
| 2012/0191079 A1 | 7/2012 | Moll et al. |
| 2012/0209260 A1 | 8/2012 | Lambert et al. |
| 2013/0085360 A1 | 4/2013 | Grunewald |
| 2013/0090649 A1 | 4/2013 | Smith et al. |
| 2013/0109982 A1 | 5/2013 | Sato et al. |
| 2013/0150693 A1 | 6/2013 | D'Angelo et al. |
| 2013/0165916 A1 | 6/2013 | Mathur et al. |
| 2013/0165941 A1 | 6/2013 | Murphy |
| 2013/0165990 A1 | 6/2013 | Mathur et al. |
| 2013/0169624 A1 | 7/2013 | Bourier et al. |
| 2013/0261692 A1 | 10/2013 | Cardinal et al. |
| 2013/0274562 A1 | 10/2013 | Ghaffari et al. |
| 2013/0274658 A1 | 10/2013 | Steinke et al. |
| 2013/0282084 A1 | 10/2013 | Mathur et al. |
| 2013/0318439 A1 | 11/2013 | Landis et al. |
| 2014/0012242 A1 | 1/2014 | Lee et al. |
| 2014/0018788 A1 | 1/2014 | Engelman et al. |
| 2014/0031813 A1 | 1/2014 | Tellio et al. |
| 2014/0058197 A1 | 2/2014 | Salahieh et al. |
| 2014/0121470 A1 | 5/2014 | Scharf et al. |
| 2014/0128860 A1* | 5/2014 | Hosaka .............. A61B 18/1815 606/33 |
| 2014/0148805 A1 | 5/2014 | Stewart et al. |
| 2014/0227437 A1 | 8/2014 | DeBoer et al. |
| 2014/0243821 A1 | 8/2014 | Salahieh et al. |
| 2014/0275993 A1 | 9/2014 | Ballakur |
| 2014/0276756 A1 | 9/2014 | Hill |
| 2014/0276811 A1 | 9/2014 | Koblish et al. |
| 2014/0288546 A1 | 9/2014 | Sherman et al. |
| 2014/0330266 A1 | 11/2014 | Thompson et al. |
| 2014/0357956 A1 | 12/2014 | Salahieh et al. |
| 2015/0005799 A1 | 1/2015 | Lindquist et al. |
| 2015/0025532 A1 | 1/2015 | Hanson et al. |
| 2015/0025533 A1 | 1/2015 | Groff et al. |
| 2015/0057655 A1 | 2/2015 | Osypka |
| 2015/0067512 A1 | 3/2015 | Roswell |
| 2015/0080883 A1 | 3/2015 | Haverkost et al. |
| 2015/0105774 A1 | 4/2015 | Lindquist et al. |
| 2015/0112256 A1 | 4/2015 | Byrne et al. |
| 2015/0112321 A1 | 4/2015 | Cadouri |
| 2015/0119875 A1 | 4/2015 | Fischell et al. |
| 2015/0119877 A1 | 4/2015 | Jameson |
| 2015/0141982 A1 | 5/2015 | Lee |
| 2015/0157382 A1 | 6/2015 | Avitall et al. |
| 2015/0216591 A1 | 8/2015 | Cao et al. |
| 2015/0216650 A1 | 8/2015 | Shaltis |
| 2015/0265329 A1 | 9/2015 | Lalonde et al. |
| 2015/0265339 A1 | 9/2015 | Lindquist et al. |
| 2015/0265812 A1 | 9/2015 | Lalonde |
| 2015/0272667 A1 | 10/2015 | Govari et al. |
| 2015/0327805 A1 | 11/2015 | Ben-Haim |
| 2015/0341752 A1 | 11/2015 | Flynn |
| 2016/0000499 A1 | 1/2016 | Lennox et al. |
| 2016/0051321 A1 | 2/2016 | Salahieh et al. |
| 2016/0085431 A1 | 3/2016 | Kim et al. |
| 2016/0106499 A1 | 4/2016 | Ogata et al. |
| 2016/0166306 A1 | 6/2016 | Pageard |
| 2016/0175041 A1 | 6/2016 | Govari et al. |
| 2016/0196635 A1 | 7/2016 | Cho et al. |
| 2016/0256305 A1 | 9/2016 | Longo et al. |
| 2016/0374748 A9 | 12/2016 | Salahieh et al. |
| 2017/0042614 A1* | 2/2017 | Salahieh ............ A61B 1/00082 |
| 2017/0042615 A1 | 2/2017 | Salahieh et al. |
| 2017/0080192 A1 | 3/2017 | Giasolli et al. |
| 2017/0143359 A1 | 5/2017 | Nguyen et al. |
| 2017/0164464 A1 | 6/2017 | Weinkam et al. |
| 2017/0311829 A1 | 11/2017 | Beeckler et al. |
| 2017/0311893 A1 | 11/2017 | Beeckler et al. |
| 2017/0312022 A1* | 11/2017 | Beeckler .............. A61B 5/6857 |
| 2017/0347896 A1 | 12/2017 | Keyes et al. |
| 2018/0074693 A1 | 3/2018 | Jones et al. |
| 2018/0110562 A1 | 4/2018 | Govari et al. |
| 2018/0125575 A1 | 5/2018 | Schwartz et al. |
| 2018/0256247 A1 | 9/2018 | Govari et al. |
| 2018/0280080 A1 | 10/2018 | Govari et al. |
| 2018/0333162 A1 | 11/2018 | Saab |
| 2018/0368927 A1 | 12/2018 | Lyons et al. |
| 2019/0001122 A1* | 1/2019 | Ganty .................. A61N 1/0558 |
| 2019/0059818 A1 | 2/2019 | Herrera et al. |
| 2019/0060622 A1 | 2/2019 | Beeckler |
| 2019/0143079 A1 | 5/2019 | Beeckler et al. |
| 2019/0175262 A1 | 6/2019 | Govari et al. |
| 2019/0175263 A1 | 6/2019 | Altmann et al. |
| 2019/0183567 A1 | 6/2019 | Govari et al. |
| 2019/0201669 A1 | 7/2019 | Govari et al. |
| 2019/0217065 A1 | 7/2019 | Govari et al. |
| 2019/0297441 A1 | 9/2019 | Dehe et al. |
| 2019/0298441 A1 | 10/2019 | Clark et al. |
| 2019/0365451 A1 | 12/2019 | Jung, Jr. |
| 2020/0001054 A1 | 1/2020 | Jimenez et al. |
| 2020/0015693 A1 | 1/2020 | Beeckler et al. |
| 2020/0022653 A1* | 1/2020 | Moisa ................ A61N 1/36514 |
| 2020/0069364 A1 | 3/2020 | Salahieh et al. |
| 2020/0085497 A1 | 3/2020 | Zhang et al. |
| 2020/0155226 A1 | 5/2020 | Valls et al. |
| 2020/0179675 A1* | 6/2020 | Cass ...................... H01R 43/24 |
| 2021/0169567 A1 | 6/2021 | Govari et al. |

FOREIGN PATENT DOCUMENTS

| | | | |
|---|---|---|---|
| CN | 102458566 A | 5/2012 | |
| CN | 203539434 U | 4/2014 | |
| CN | 104244856 A | 12/2014 | |
| CN | 104546117 A | 4/2015 | |
| CN | 105105844 A | 12/2015 | |
| CN | 105473091 A | 4/2016 | |
| CN | 105473093 A | 4/2016 | |
| CN | 107374725 A * | 11/2017 | ............. A61N 7/022 |
| EP | 0779059 A1 | 6/1997 | |
| EP | 1790304 A2 | 5/2007 | |
| EP | 2749214 A1 | 7/2014 | |
| EP | 2865350 A2 | 4/2015 | |
| EP | 2875790 A2 | 5/2015 | |
| EP | 3238646 A2 | 11/2017 | |
| EP | 3238648 A1 | 11/2017 | |
| EP | 3251622 A1 | 12/2017 | |
| EP | 3300680 A1 | 4/2018 | |
| EP | 3315087 A1 | 5/2018 | |
| EP | 3332727 A2 | 6/2018 | |
| EP | 3381396 A1 | 10/2018 | |
| EP | 3571983 A2 | 11/2019 | |
| EP | 3586778 A1 | 1/2020 | |
| EP | 3653153 A1 | 5/2020 | |
| EP | 3834758 A1 | 6/2021 | |
| JP | H06261951 A | 9/1994 | |
| JP | H09503689 A | 4/1997 | |
| JP | H1176233 A | 3/1999 | |
| JP | 2000504242 A | 4/2000 | |
| JP | 2005052424 A | 3/2005 | |
| JP | 2010507404 A | 3/2010 | |
| JP | 2012024156 A | 2/2012 | |
| JP | 2013013726 A | 1/2013 | |
| JP | 2013078587 A | 5/2013 | |
| JP | 2013529109 A | 7/2013 | |
| JP | 2014529419 A | 11/2014 | |
| JP | 2015503365 A | 2/2015 | |
| JP | 2015100706 A | 6/2015 | |
| JP | 2015112113 A | 6/2015 | |
| JP | 2015112114 A | 6/2015 | |
| JP | 2015518776 A | 7/2015 | |

(56) References Cited

FOREIGN PATENT DOCUMENTS

| | | | | |
|---|---|---|---|---|
| JP | 2016515442 A | 5/2016 | | |
| JP | 2016116863 A | 6/2016 | | |
| JP | 2017202305 A | 11/2017 | | |
| JP | 2017202306 A | 11/2017 | | |
| WO | 95/10326 A1 | 4/1995 | | |
| WO | WO-9900060 A1 * | 1/1999 | ......... | A61B 18/1492 |
| WO | 0056237 A2 | 9/2000 | | |
| WO | 02102231 A2 | 12/2002 | | |
| WO | 2005041748 A2 | 5/2005 | | |
| WO | 2008049087 A2 | 4/2008 | | |
| WO | 2011143468 A2 | 11/2011 | | |
| WO | 2013049601 A2 | 4/2013 | | |
| WO | 2013052919 A2 | 4/2013 | | |
| WO | 2013154776 A2 | 10/2013 | | |
| WO | 2014168987 A1 | 10/2014 | | |
| WO | 2015049784 A1 | 4/2015 | | |
| WO | 2016183337 A2 | 11/2016 | | |
| WO | 2016210437 A1 | 12/2016 | | |
| WO | 2017024306 A1 | 2/2017 | | |
| WO | 2017087549 A1 | 5/2017 | | |
| WO | 2018106569 A1 | 6/2018 | | |
| WO | 2018129133 A1 | 7/2018 | | |
| WO | 2019095020 A1 | 5/2019 | | |

OTHER PUBLICATIONS

Search Report with English translation dated Feb. 28, 2025, from corresponding Japanese Application No. 2021-177377.
Notice of Reasons for Refusal with English translation dated Mar. 18, 2025, from corresponding Japanese Application No. 2021-177377.
Written Opinion with English translation dated Jun. 4, 2025, from corresponding Japanese Application No. 2021-177377.
Decision to Grant a Patent with English translation dated Jun. 17, 2025, from corresponding Japanese Application No. 2021-177377.
Exam Report dated Jun. 30, 2025, from corresponding European Application No. 21205637.8.
Angela O., "AF Symposium 2017: First-in-Man Study Shows Promising Results with a Multi-Electrode Radiofrequency Balloon for Paroxysmal AF Treatment," Cardiac Rhythm News, Jan. 20, 2017, 2 Pages, [Retrieved on Dec. 16, 2020] Retrieved from URL: https://cardiacrhythmnews.com/fist-in-man-study-shows-promising-results-with-a-multi-electrode-radiofrequency-balloon-for-paroxysmal-af-treatment/.
Casella M., et al., "Ablation Index as a Predictor of Long-Term Efficacy in Premature Ventricular Complex Ablation: A Regional Target Value Analysis," Heart Rhythm Society, Jun. 2019, vol. 16, No. 6, pp. 888-895.
Co-Pending U.S. Appl. No. 14/578,807, filed Dec. 22, 2014, 21 pages.
Das M., et al., "Ablation Index, a Novel Marker of Ablation Lesion Quality: Prediction of Pulmonary Vein Reconnection at Repeat Electrophysiology Study and Regional Differences in Target Values," Europace, 2017, Published Online May 31, 2016, vol. 19, pp. 775-783.
Dorobantu M., et al., "Oral Anticoagulation During Atrial Fibrillation Ablation: Facts and Controversies," Cor et Vasa, 2013, Accepted on Dec. 3, 2012, vol. 55, No. 2, pp. e101-e106, Retrieved from URL: https://www.sciencedirect.com/science/article/pii/S0010865012001415.
Extended European Search Report for Application No. EP17168513.4 mailed Sep. 18, 2017, 11 pages.
Extended European Search Report for European Application No. 15201723.2, mailed May 11, 2016, 07 Pages.
Extended European Search Report for European Application No. 17168393.1 mailed Dec. 15, 2017, 12 Pages.
Extended European Search Report for European Application No. 17168518.3, mailed Sep. 20, 2017, 9 Pages.
Extended European Search Report for European Application No. 17173893.3, mailed Nov. 6, 2017, 8 Pages.
Extended European Search Report for European Application No. 17201434.2, mailed Feb. 1, 2018, 10 Pages.
Extended European Search Report for European Application No. 17205876.0, mailed Jun. 1, 2018, 13 Pages.
Extended European Search Report for European Application No. 19177365.4, mailed Nov. 8, 2019, 07 Pages.
Extended European Search Report for European Application No. 19183327.6, mailed Nov. 21, 2019, 8 Pages.
Extended European Search Report for European Application No. 20153872.5, mailed May 7, 2020, 9 Pages.
Extended European Search Report for European Application No. 20195648.9, mailed Feb. 12, 2021, 8 Pages.
Fornell D., "Multi-Electrode RF Balloon Efficient for Acute Pulmonary Vein Isolation," Diagnostic and Interventional Cardiology, May 17, 2017, 3 Pages, [Retrieved on Dec. 16, 2020] Retrieved from URL: www.dicardiology.com/article/multi-electrode-rf-balloon-efficient-acute-pulmonary-vein-isolation.
Haines D.E., et al., "The Promise of Pulsed Field Ablation," Dec. 2019, vol. 19, No. 12, 10 pages.
Honarbakhsh S., et al., "Radiofrequency Balloon Catheter Ablation for Paroxysmal Atrial Fibrillation, Radiance Study—a UK experience," EP Europace, Oct. 2017, vol. 19, No. 1, p. i21, 3 Pages.
International Search Report and Written Opinion for International Application No. PCT/IB2019/052313, mailed Jul. 22, 2019, 8 Pages.
International Search Report and Written Opinion for International Application No. PCT/IB2019/056381, mailed Dec. 17, 2019, 10 pages.
International Search Report and Written Opinion for International Application No. PCT/IB2019/057743, mailed Dec. 6, 2019, 16 Pages.
International Search Report and Written Opinion issued in corresponding International Application No. PCT/IB2019/057742, dated Nov. 28, 2019, 18 Pages.
Nagashima K., et al., "Hot Balloon Versus Cryoballoon Ablation for Atrial Fibrillation," Circulation: Arrhythmia and Electrophysiology, May 2018, vol. 11, No. 5, e005861, 9 Pages.
Napoli N., et al., "For Atrial Fibrillation Ablation, Newer Anticoagulant Reduces Major Bleeds," American College of Cardiology, Mar. 19, 2017, 4 Pages, [Retrieved on Jan. 21, 2022] Retrieved from URL: https://www.acc.org/about-acc/press-releases/2017/03/18/08/47/sun-1045am-for-atrial-fibrillation-ablation-newer-anticoagulant-reduces-major-bleeds.
Okano T., et al., "Wire Perforation Causing Cardiopulmonary Arrest During Radiofrequency Hot Balloon Ablation for Pulmonary Vein Isolation," Journal of Cardiology Cases, Feb. 15, 2019, vol. 19, No. 5, pp. 169-172.
Partial European Search Report for European Application No. 17168393.1 mailed Sep. 13, 2017, 13 Pages.
Partial European Search Report for European Application No. 17205876.0, mailed Feb. 22, 2018, 10 Pages.
Reddy V.Y., et al., "Balloon Catheter Ablation to Treat Paroxysmal Atrial Fibrillation: What is the Level of Pulmonary Venous Isolation?," Heart Rhythm, Mar. 2008, vol. 5, No. 3, pp. 353-360, 3 Pages.
Winkle R.A., et al., "Atrial Fibrillation Ablation Using Open-Irrigated Tip Radiofrequency: Experience with Intraprocedural Activated Clotting Times≤210 Seconds," Heart Rhythm, Jun. 2014, Epub Mar. 27, 2014, vol. 11, No. 6, pp. 963-968.
Youtube:, "Intensity™ CX4 Professional E-Stim/ Ultrasound Combo," Dec. 22, 2015, 1 Page, [Retrieved on Nov. 19, 2020], Retrieved from URL: https://www.youtube.com/watch?v=76s1QKMWJME].
Youtube: "New Interface TactiCath Contact Force Ablation Catheter," Nov. 26, 2013, 1 Pages, [Retrieved on Nov. 19, 2020], Retrieved from URL: https: /Avww.youtube.com/watch?v=aYvYO8Hpylg].

* cited by examiner

BALLOON CATHETER WITH SPLIT ELECTRODES

FIELD OF THE INVENTION

The present invention relates generally to medical devices, and particularly to devices and methods for ablation and sensing of physiological tissues.

BACKGROUND

Radio-frequency ablation (RFA) is a medical procedure in which part of the electrical conduction pathways of the heart or other dysfunctional tissue are ablated using the heat generated from radio-frequency (RF) alternating current (for example in the frequency range of 350-500 kHz). The ablation is done by inserting a probe, such as a catheter, into the tissue, and applying the RF current to electrodes at the tip of the probe. The probe may also be used for acquiring electrophysiological signals for diagnostic purposes.

United States Patent Application Publication 2015/0119877 describes methods, systems, and devices for providing treatment to a tissue in body lumens. The system may include a support shaft, an expansion member coupled with a distal portion of the support shaft, and an ablation structure wrapped around the expansion member less than a circumference of the expansion member configured to engage the body lumens with varying sizes.

United States Patent Application Publication 2012/0029500 describes a catheter that includes a flexible shaft having a length sufficient to access a patient's renal artery. A treatment element at the distal end of the shaft is dimensioned for deployment within the renal artery. The treatment element includes a radially expandable structure configured to maintain positioning within the renal artery.

U.S. Pat. No. 10,653,480 describes a method of constructing an electrophysiology catheter having a flex circuit electrode assembly. The method includes providing a flex circuit having a substrate, a first conductive layer and a second conductive layer.

SUMMARY

Embodiments of the present invention that are described hereinbelow provide improved probes for ablation and sensing, as well as methods for their production and operation.

There is therefore provided, in accordance with an embodiment of the present invention, a medical apparatus, which includes a probe. The probe includes an insertion tube configured for insertion into a body cavity of a patient, a balloon, which is connected distally to the insertion tube and is configured to be inflated within the body cavity with a fluid that flows into the balloon through the insertion tube, and a plurality of electrodes, which are disposed at different respective locations on a surface of the balloon and are configured to contact tissue within the body cavity. Each electrode is divided into multiple segments, including at least two segments having different respective areas. The medical apparatus also includes an electrical signal generator, which is configured to apply radio-frequency (RF) signals simultaneously in parallel to the multiple segments of each electrode with an amplitude sufficient to ablate the tissue contacted by the electrode. Sensing circuitry is configured to acquire electrophysiological signals from at least one of the multiple segments of each electrode separately and independently of the other segments of the electrode.

In a disclosed embodiment, the at least two segments include first and second segments having respective first and second areas, such that the first area is at least twice the second area.

In a further embodiment, the first area is at least four times the second area.

In yet a further embodiment, the balloon includes one or more irrigation apertures passing through the first segment, but not through the second segment, such that the fluid flows out of the balloon through the irrigation apertures to irrigate the tissue contacted by at least the first segment.

In a disclosed embodiment, each electrode is divided into the segments by at least one longitudinal isolation line. Additionally or alternatively, each electrode is divided into the segments by at least one latitudinal isolation line.

There is also provided, in accordance with an embodiment of the present invention, a method for medical treatment and diagnostics. The method includes providing a probe for insertion into a body cavity of a patient, wherein the probe includes an insertion tube, a balloon, which is connected distally to the insertion tube and a plurality of electrodes, which are disposed at different respective locations on a surface of the balloon, each electrode being divided into multiple segments, including at least two segments having different respective areas. The method further includes inflating the balloon within the body cavity with a fluid that flows into the balloon through the insertion tube, so that one or more of the electrodes on the surface of the inflated balloon contact tissue within the body cavity. Radio-frequency (RF) signals are applied simultaneously in parallel to the multiple segments of the one or more of the electrodes with an amplitude sufficient to ablate the tissue contacted by the electrodes. Electrophysiological signals are acquired from at least one of the multiple segments of each of the one or more of the electrodes separately and independently of the other segments of the electrodes.

The present invention will be more fully understood from the following detailed description of the embodiments thereof, taken together with the drawings in which:

DETAILED DESCRIPTION OF EMBODIMENTS

Figure 1:
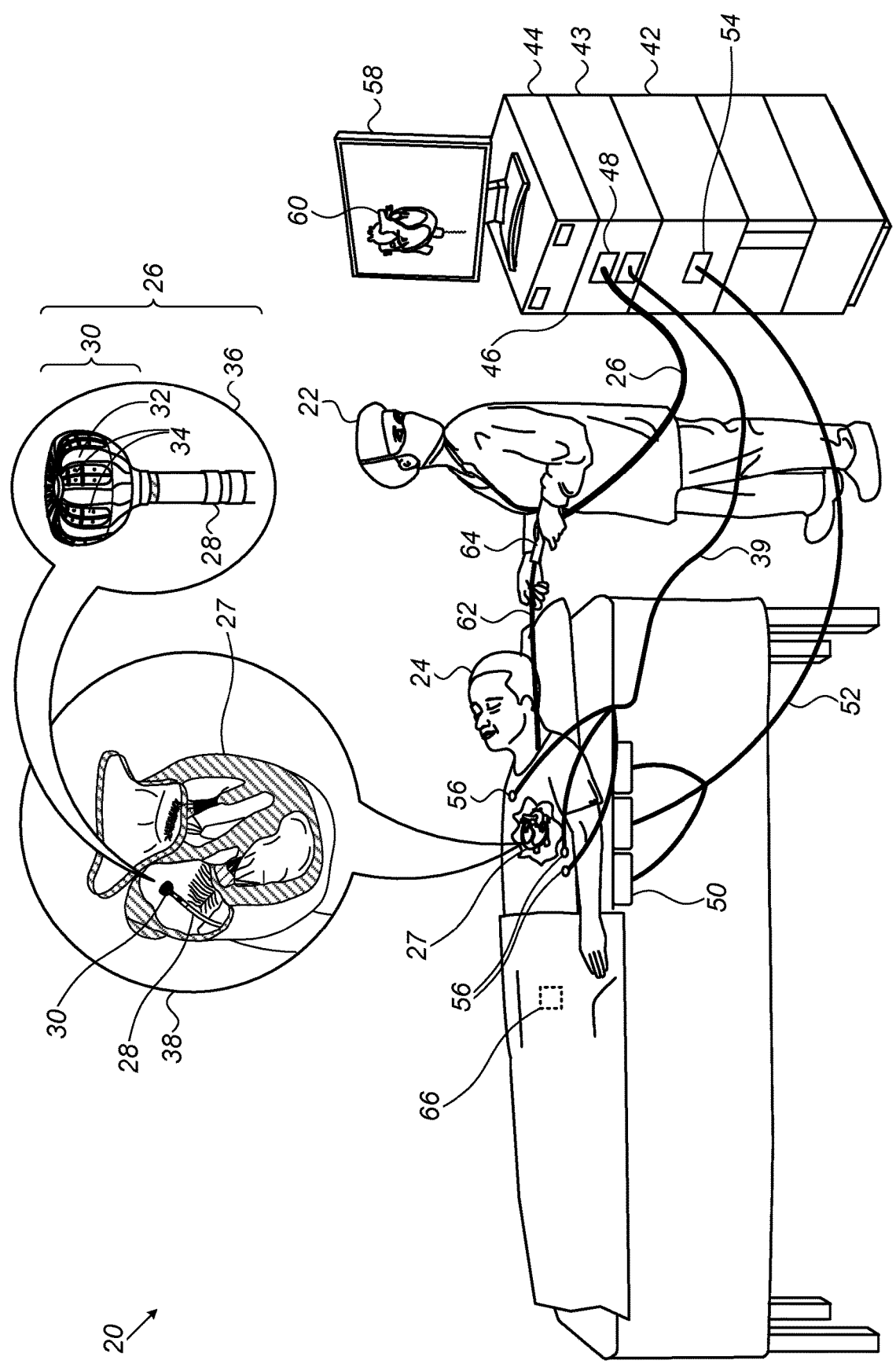
FIG. 1 is a schematic pictorial illustration of a medical apparatus in the course of an RFA procedure, in accordance with an embodiment of the invention.

In a radio-frequency ablation (RFA) procedure, an alternating electrical current, typically with a frequency between 350 and 500 kHz, is driven through the tissue of a subject. The electrical current is carried into the tissue through the electrodes of a catheter placed in contact with the tissue. These electrodes may also be used for diagnostic purposes, by acquiring electrophysiological signals from the tissue they are touching.

Some RFA procedures use a balloon catheter, which has a balloon at its distal end and electrodes arrayed around the surface of the balloon. The balloon is inflated within the body cavity, and the electrodes are then brought into contact with the tissue that is to be ablated. To avoid damage to the electrodes and injury to the tissue due to excessive current density, the electrodes on the balloon are typically large, for example about 5 mm$^2$.

For ablating tissue within the body, for example in the left atrium of the heart, balloons of small diameter can be used, for example with diameter less than 15 mm. Despite the small size of the balloon itself, the electrodes are large enough to be able to transfer RFA current without being damaged. In this case, the size of the electrodes precludes them from being effectively used for diagnosis, since each electrode acquires signals from a relatively large region of tissue, and at any given time this region typically generates multiple signals. The balloon could have separate electrodes for signal acquisition, but this solution may be impractical due to the small size of the balloon.

The embodiments of the present invention that are described herein address this problem by providing a probe having a balloon with segmented electrodes. An electrical signal generator applies RF signals simultaneously in parallel to multiple segments of each electrode with an amplitude sufficient to ablate the tissue contacted by the electrode. On the other hand, sensing circuitry is able to acquire electrophysiological signals from at least one of the segments of each electrode separately and independently of the other segments. Thus, the electrode has a sufficient effective area to deliver the RFA current safely, while still allowing signals to be acquired with fine spatial resolution.

In the disclosed embodiments, the probe comprises an insertion tube for insertion into a body cavity of a patient, as well as a balloon connected to the distal end of the insertion tube and inflatable with a fluid that flows into the balloon through the insertion tube. The surface of the balloon has a plurality of electrodes for contacting tissue within the body cavity, with each electrode divided into segments of unequal areas.

The electrical signal generator applies radio-frequency (RF) signals simultaneously in parallel to the segments of each electrode with an amplitude sufficient to ablate the tissue contacted by the electrode. Connecting the segments in parallel for RFA, particularly the larger segments, ensures a sufficiently large surface area in order to avoid damage to the electrode due to the RF currents.

The sensing circuitry acquires separate, independent electrophysiological signals from separate segments of each electrode. Acquiring the signals particularly from the smaller segments ensures that each segment acquires its signal from a small, localized area of the tissue.

In a further embodiment, irrigation apertures pass through the larger segments utilized for RFA, so that fluid may flow out of the balloon through the apertures to irrigate the tissue contacted by the larger segments. The smaller segments, however, may have no irrigation apertures as they are utilized mainly for signal acquisition and deliver at most a small fraction of the ablation current.

System Description

FIG. 1 is a schematic pictorial illustration of a medical apparatus 20 in the course of an RFA procedure, in accordance with an embodiment of the invention. A physician 22 performs the RFA procedure on a subject 24, using an ablation catheter 26, with further details of the catheter described hereinbelow. Physician 22 further utilizes ablation catheter 26 for acquiring electrophysiological signals from tissue of subject 24, either concurrently or alternatingly with emitting RF currents. The embodiment shown in the current figure and subsequent figures refers to an example of an RFA procedure in a chamber of a heart 27. In alternative embodiments, the RFA procedure and electrophysiological signal acquisition may be performed not only in heart 27, but also in other organs and tissue, as will be apparent to those skilled in the art after reading the present description.

Figure 2:
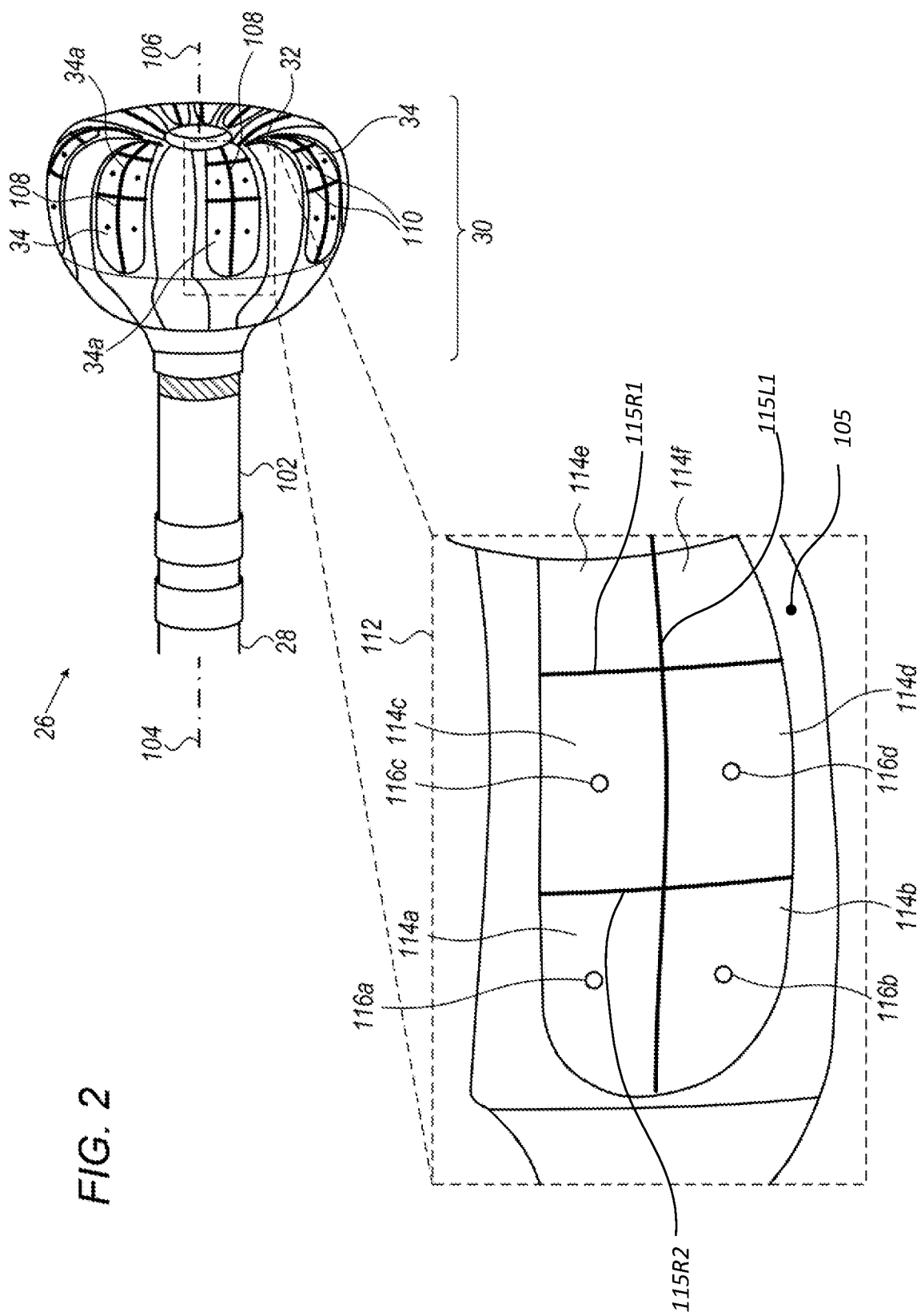
FIG. 2 is a schematic detail view of the distal end of a combined ablation and signal acquisition catheter, in accordance with an embodiment of the invention.

As shown in an inset 36, ablation catheter 26 comprises a shaft 28 and a distal assembly 30, wherein the shaft functions as an insertion tube for inserting the distal assembly into the chamber of heart 27. Distal assembly 30 comprises a balloon 32 with a plurality of ablation electrodes 34, wherein the electrodes have been divided into segments having unequal areas, as shown in FIG. 2. Distal assembly 30 and a part of shaft 28 are also shown in an inset 38.

Medical apparatus 20 further comprises a processor 42, sensing circuitry 43, and an electrical signal generator 44, typically residing in a console 46. The processor, the sensing circuitry, and the signal generator may each comprise one or several circuit components. Catheter 26 is connected to console 46 via an electrical interface 48, such as a port or socket. RF signals are carried from signal generator 44 to distal assembly 30, and electrophysiological signals are carried from the distal assembly to sensing circuitry 43, both via interface 48 and electrical wires (not shown) running through catheter 26.

Processor 42 receives from physician 22 (or another operator), prior to and/or during the ablation procedure, setup parameters for the procedure. For example, using one or more suitable input devices, such as a keyboard, mouse, or touch screen (not shown), physician 22 defines the electrical and temporal parameters of the RFA signals to be applied to some or all of the segments of electrodes 34. Processor 42 passes suitable control signals to signal generator 44 for performing the RFA. Processor 42 also instructs sensing circuitry 43 to acquire electrophysiological signals from certain segments of electrodes 34, as will be further detailed in FIG. 2.

Processor 42 may be further configured to track the respective positions of electrodes 34 during the RFA procedure and during electrophysiological signal acquisition, using any suitable tracking technique. For example, distal assembly 30 may comprise one or more electromagnetic position sensors (not shown), which, in the presence of an external magnetic field generated by one or more magnetic-field generators 50, output signals that vary with the positions of the sensors. Based on these signals, processor 42 may ascertain the positions of electrodes 34. Magnetic-field generators 50 are connected to console 46 via cables 52 and an interface 54. Alternatively, for each electrode 34, processor 42 may ascertain the respective impedances between the electrode and multiple external electrodes 56 on the body surface of subject 24 at various different locations, and then compute the ratios between these impedances, these ratios being indicative of the electrode's location. As yet another alternative, the processor may use both electromagnetic tracking and impedance-based tracking, as described, for example, in U.S. Pat. No. 8,456,182, whose disclosure is incorporated herein by reference.

In some embodiments, processor 42 displays, on a display screen 58, a relevant image 60 of the subject's anatomy, annotated, for example, to show the current position and orientation of distal assembly 30. Alternatively or additionally, processor 42 may display on screen 58 a map of the electrophysiological signals acquired through electrodes 34.

Processor 42, sensing circuitry 43, and electric signal generator 44 may typically comprise both analog and digital elements. Thus, sensing circuitry 43 may comprise multiple inputs with respective analog-to-digital converters (ADCs) for receiving analog electrophysiological signals from catheter 26 and for converting them to digital form for passing them to processor 42. Electric signal generator 44 typically comprises RF analog circuits for generating the RF signals for ablation, as well as digital-to-analog converters (DACs) for receiving digital control signals from processor 42.

Alternatively, the electrophysiological signals and/or control signals may be passed between processor 42 and sensing circuitry 43 and electric signal generator 44, respectively, in an analog form, provided that processor 42 is configured to send and/or to receive analog signals.

Furthermore, processor 42 typically comprises digital filters for extracting signals at given frequencies from the received electrophysiological signals.

Typically, the functionality of processor 42, as described herein, is implemented at least partly in software. For example, processor 42 may comprise a programmed digital computing device comprising at least a central processing unit (CPU) and random access memory (RAM). Program code, including software programs, and/or data are loaded into the RAM for execution and processing by the CPU. The program code and/or data may be downloaded to the processor in electronic form, over a network, for example. Alternatively or additionally, the program code and/or data may be provided and/or stored on non-transitory tangible media, such as magnetic, optical, or electronic memory. Such program code and/or data, when provided to the processor, produce a machine or special-purpose computer, configured to perform the tasks described herein.

At the start of the RFA procedure, physician 22 inserts catheter 26 through a sheath 62 via the vascular system of subject 24 into heart 27, with balloon 32 in a collapsed configuration. Only after the catheter exits the sheath is the balloon inflated to its intended functional shape with a fluid that flows into the balloon through shaft 28. This functional shape is shown in insets 36 and 38. By containing balloon 32 in a collapsed configuration, sheath 62 also serves to minimize vascular trauma while the balloon is brought to the target location. Physician 22 navigates catheter 26 to a target location in heart 27 of subject 24, by manipulating the catheter, using a manipulator 64 near the proximal end of the catheter, and/or deflection from sheath 62. Physician 22 brings distal assembly 30 into contact with tissue, such as myocardial tissue, of heart 27. Next, under the control of physician 22 and processor 42, electrical signal generator 44 generates RFA signals, which are carried through catheter 26 in parallel to the segments of electrodes 34.

In a unipolar RFA, the currents of ablation signals flow between ablation electrodes 34 and an external electrode, or "return patch" 66, which is coupled externally between subject 24, typically on the skin of the subject's torso, and generator 44. In a bipolar RF ablation the currents of the signals flow between pairs of ablation electrodes 34.

Processor 42 acquires, either simultaneously with or alternating with the RFA, electrophysiological signals received separately and independently by selected segments of electrodes 34 from tissue of subject 24. The electrophysiological signals are carried from electrodes 34 through catheter 26 to processor 42.

Notwithstanding the particular type of ablation procedure illustrated in FIG. 1, the principles of the present invention may be applied to any suitable type of multi-channel radio-frequency ablation procedure.

FIG. 2 is a schematic detail view of the distal end of catheter 26, in accordance with an embodiment of the invention.

As described above, catheter 26 comprises shaft 28 (with only a section shown here) and distal assembly 30. Distal assembly 30 comprises balloon 32 and electrodes 34 at different respective locations on the surface of the balloon. Balloon 32 has a polar axis 106 coinciding with a longitudinal axis 104 of a distal end 102 of shaft 28. A plurality of flexible circuit substrates 105 are disposed on the expandable member about longitudinal axis 104. On each substrate 105, there is provided electrode 34. As shown, there are a plurality of electrode members (designate individually as 34) for each substrate 105. Each of electrodes 34 is divided into segments 114 along longitudinal isolation lines 108 and latitudinal isolation lines 110 (wherein "longitudinal" and "latitudinal" are defined with reference to polar axis 106). For example, electrode 34a (one of electrodes 34), shown in greater detail in an inset 112, is divided into six segments 114a, 114b, 114c, 114d, 114e, and 114f. Four of the segments, 114a-114d, have the same (or nearly same) area, whereas segments 114e and 114f are smaller than segments 114a-114d, each having an area that is, for example, approximately a quarter (¼) of the area of each of segments 114a-114d. Each segment 114 (i.e., 114a, 114b, 114c or 114d) is connected individually to a respective wire or other conductor such as electrical traces (not shown), which passes through shaft 28 to console 46, thus enabling sensing circuitry 43 and electrical signal generator 44 to address the segments individually or in parallel for purposes of sensing and ablation, as explained above. That is, each of the larger electrode segments 116a, 116b, 116c, 116d and smaller electrode segments 116e and 116f are electrically insulated from each other on the expandable member.

Electrode 34a comprises irrigation apertures 116a, 116b, 116c, and 116d, each passing through a respective segment 114a, 114b, 114c, and 114d, providing paths for fluid to flow out of balloon 32 to irrigate the tissue contacted by and in the vicinity of the respective segment. However, the two smaller segments 114e and 114f typically do not have irrigation apertures and may be irrigated by apertures 116c and 116d, for example. In alternative embodiments the smaller segments may also have irrigation apertures, as well.

In other embodiments, the number of segments of each electrode 34 may be more or less than six. Additionally or alternatively, the ratio between the areas of the larger and smaller segments may be different from 4:1 (the numeral "4" indicating that the larger segment is approximately 4 times that of the smaller segment), but it is typically at least 2:1; and the number of irrigation apertures may be different from one for the larger segments. Furthermore, although FIG. 2 shows electrodes 34 divided into segments along longitudinal and latitudinal lines 108 and 110, the division may be implemented by only longitudinal lines or by only latitudinal lines. The dividing lines may also have a different geometry, such as, for example a non-90 degree angle with respect to latitudinal lines 110.

For the purpose of ablation using electrode 34a, processor 42 commands signal generator 44 to apply an RF signal with an amplitude sufficient to ablate the tissue contacted by the electrode. The RF signal is applied simultaneously in parallel to all or some of segments 114a-114f so as to provide a sufficiently large conducting area for RF current to be passed through without damage to electrode 34a.

For the purpose of acquiring an electrophysiological signal using electrode 34a, processor 42 connects sensing circuitry 43 individually to one or more of segments 114a-114f, for example to the smaller segments 114e-114f. Thus, the conducting area through which the electrophysiological signal is acquired is sufficiently small to prevent the signals to be averaged over a wide area of the tissue. The electrophysiological signals may be acquired in this fashion concurrently from multiple segments, as well as multiple different electrodes.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A medical apparatus, comprising:
    a probe, which comprises:
        an insertion tube configured for insertion into a body cavity of a patient;
        a balloon, which is connected distally to the insertion tube and is configured to be inflated within the body cavity with a fluid that flows into the balloon through the insertion tube, the balloon comprising a plurality of irrigation apertures;
        a plurality of flexible circuit substrates disposed radially about a longitudinal axis at different respective locations on a surface of the balloon; and
        a plurality of ablation electrodes, which are each disposed on a respective flexible circuit substrate of the plurality of flexible circuit substrates such that each electrode is disposed on a different flexible circuit substrate and are configured to contact tissue within the body cavity, each ablation electrode being divided into at least six segments comprising a first segment having a first area, a second segment having a second area, a third segment having a third area, a fourth segment having a fourth area, a fifth segment having a fifth area, and a sixth segment having a sixth area, such that the first area, the third area, the fifth area, and the sixth area are each at least twice the second area and at least twice the fourth area, each ablation electrode being divided into the first and second segments by at least one latitudinal isolation line that is entirely disposed on the respective flexible circuit substrate, and a respective irrigation aperture of the plurality of irrigation apertures passing through the first segment, the third segment, the fifth segment, and the sixth segment, but not through the second segment nor through the fourth segment, such that the fluid flows out of the balloon through the irrigation apertures to irrigate the tissue contacted by at least the first segment;
    an electrical signal generator, which is configured to apply radio-frequency (RF) signals simultaneously in parallel to the at least six segments of each ablation electrode with an amplitude sufficient to ablate the tissue contacted by the ablation electrode, each segment of the at least six segments being connected to the electric signal generator such that each segment of the at least six segments is individually capable of applying the RF signals to ablate the tissue contacted by the ablation electrode; and
    sensing circuitry, which is configured to acquire electrophysiological signals from at least one segment of the at least six segments of each ablation electrode separately and independently of the other segments of the at least six segments of the ablation electrode.

2. The medical apparatus according to claim 1, wherein the first area is at least four times the second area.

3. The medical apparatus according to claim 1, wherein the first segment, the second segment, the third segment, and the fourth segment of each ablation electrode are entirely disposed on the respective flexible circuit such that outer longitudinal edges of the first segment, the second segment, the third segment, and the fourth segment of each ablation electrode are inset relative to outer edges of the respective flexible circuit.

4. The medical apparatus according to claim 1, the probe comprising a plurality of conductors passing through the insertion tube, each segment of the at least six segments being connected to a respective conductor of the plurality of conductors such that (i) each segment of the at least six segments is individually capable of applying the RF signals to ablate the tissue contacted by the ablation electrode and (ii) the sensing circuitry is capable of acquiring electrophysiological signals from each segment of the at least six segments separately and independently of the other segments of the at least six segments of the ablation electrode.

5. The medical apparatus according to claim 1, wherein at least the first segment, the third segment, the fifth segment, and the sixth segment of each ablation electrode are entirely disposed on the respective flexible circuit such that outer edges of the first segment, the third segment, the fifth segment, and the sixth segment are inset relative to outer edges of the respective flexible circuit.

6. A method for medical treatment and diagnostics, the method comprising:
    providing a probe for insertion into a body cavity of a patient, wherein the probe comprises:
        an insertion tube;
        a balloon, which is connected distally to the insertion tube, the balloon comprising a plurality of irrigation apertures; and
        a plurality of flexible circuit substrates disposed radially about a longitudinal axis at different respective locations on a surface of the balloon; and
        a plurality of ablation electrodes, which are each disposed on a respective flexible circuit substrate of the plurality of flexible circuit substrates such that each electrode is disposed on a different flexible circuit substrate, each ablation electrode being divided into at least six segments comprising a first segment having a first area, a second segment having a second area, a third segment having a third area, a fourth segment having a fourth area, a fifth segment having a fifth area, and a sixth segment having a sixth area, such that the first area, the third area, the fifth area, and the sixth area are each at least twice the second area and at least twice the fourth area, each ablation electrode being divided into the first and second segments by at least one latitudinal isolation line that is entirely disposed on the respective flexible circuit substrate, and a respective irrigation aperture of the plurality of irrigation apertures passing through the first segment, the third segment, the fifth segment, and the sixth segment, but not through the second segment nor through the fourth segment;
    inflating the balloon within the body cavity with a fluid that flows into the balloon through the insertion tube, so that one or more of the ablation electrodes on the surface of the inflated balloon contact tissue within the body cavity, and such that the fluid flows out of the balloon through the irrigation apertures to irrigate the tissue contacted by at least the first segment;
    applying radio-frequency (RF) signals simultaneously in parallel to the at least six segments of the ablation electrodes with an amplitude sufficient to ablate the tissue contacted by the ablation electrodes, each segment of the at least six segments being connected to an electric signal generator such that each segment of at least two segments is individually capable of applying the RF signals to ablate the tissue contacted by the ablation electrode; and acquiring electrophysiological signals, via sensing circuitry, from at least one of the at least six segments of each of the ablation electrodes separately and independently of the other segments of the ablation electrodes.

7. The method according to claim 6, wherein the first area is at least four times the second area.

8. The method according to claim 6,
wherein the first segment, the second segment, the third segment, and the fourth segment of each ablation electrode are entirely disposed on the respective flexible circuit such that outer longitudinal edges of the first segment, the second segment, the third segment, and the fourth segment of each ablation electrode are inset relative to outer edges of the respective flexible circuit.

9. The method according to claim 6, the probe comprising a plurality of conductors passing through the insertion tube, each segment of the at least six segments being connected to a respective conductor of the plurality of conductors such that (i) each segment of the at least six segments is individually capable of applying the RF signals to ablate the tissue contacted by the ablation electrode and (ii) the sensing circuitry is capable of acquiring electrophysiological signals from each segment of the at least six segments separately and independently of the other segments of the at least six segments of the ablation electrode.

10. The method according to claim 6, wherein at least the first segment, the third segment, the fifth segment, and the sixth segment of each ablation electrode are entirely disposed on the respective flexible circuit such that outer edges of the first segment, the third segment, the fifth segment, and the sixth segment are inset relative to outer edges of the respective flexible circuit.

11. A medical apparatus, comprising:
a probe comprising:
an insertion tube configured for insertion into a body cavity of a patient;
an expandable member having a longitudinal axis, which is connected distally to the insertion tube and is configured to be expanded about the longitudinal axis inside an organ, the expandable member comprising a plurality of irrigation apertures;
a plurality of flexible circuit substrates disposed radially about the longitudinal axis; and
a plurality of electrodes disposed radially about the longitudinal axis, each electrode of the plurality of electrodes being disposed on a respective flexible circuit substrate of the plurality of flexible circuit substrates such that each electrode is disposed on a different flexible circuit substrate, and each electrode is divided along at least at least one latitudinal isolation line and at least one longitudinal isolation line into multiple segments, including at least two larger electrode segments having approximately equal surface area and at least two smaller electrode segments in which each of the at least two smaller electrode segments have approximately one-fourth the surface area of each of the two larger electrode segments, and such that the larger and smaller electrode segments are insulated from each other to define separate electrodes, the at least one latitudinal isolation line being entirely disposed on the respective flexible circuit substrate, a respective irrigation aperture of the plurality of irrigation apertures passing through the at least two larger electrode segments, but not through the at least two smaller electrode segments, such that fluid flows out of the expandable member through the irrigation apertures to irrigate tissue of the organ,
each segment of the multiple segments being capable of ablating the organ, and at least one segment of the multiple segments being capable of acquiring electrophysiological signals from the organ.

12. The medical apparatus of claim 11, wherein the at least two larger electrode segments comprise four larger electrode segments.

13. The medical apparatus of claim 12, in which the four larger electrode segments and the at least two smaller electrode segments are entirely disposed on a single flexible electrode substrate.

14. The medical apparatus of claim 12, wherein the at least one latitudinal isolation line comprises a first latitudinal isolation line and a second latitudinal isolation line that are each entirely disposed on the respective flexible circuit substrate, and wherein the at least one longitudinal isolation line comprises a first longitudinal isolation line, the first latitudinal isolation line, the second latitudinal isolation line, and the first longitudinal isolation line being defined with reference to a polar axis that coincides with the longitudinal axis, the first latitudinal isolation line dividing a first pair of the four larger electrode segments and the at least two smaller electrode segments, the second latitudinal isolation line dividing the first pair of the four larger electrode segments and a second pair of the four larger electrode segments, and the first longitudinal isolation line dividing the at least two smaller electrode segments from one another, the larger electrode segments of the first pair from one another, and the larger electrode segments of the second pair from one another.

15. The medical apparatus of claim 11, the at least one longitudinal isolation line and the at least one latitudinal isolation line being defined with reference to a polar axis that coincides with the longitudinal axis, the longitudinal isolation line dividing the at least two larger electrode segments from one another and the at least two smaller electrode segments from one another, and the latitudinal isolation line dividing the at least two larger electrode segments and the at least two smaller electrode segments.

16. The medical apparatus according to claim 11, the probe comprising a plurality of conductors passing through the insertion tube, each segment of the multiple segments being connected to a respective conductor of the plurality of conductors such that (i) each segment of the multiple segments is individually capable of ablating the organ contacted by the electrode and (ii) each segment of the multiple segments is capable of acquiring electrophysiological signals separately and independently of the other segments of the multiple segments of the electrode.

17. The medical apparatus according to claim 11, wherein the at least two larger electrode segments of each electrode are entirely disposed on the respective flexible circuit such that outer longitudinal edges of the at least two larger electrode segments of each electrode are inset relative to outer edges of the respective flexible circuit.

* * * * *